United States Patent [19]

Hull et al.

[11] Patent Number: 5,007,993
[45] Date of Patent: Apr. 16, 1991

[54] ELECTROLYTIC PROCESSING APPARATUS AND METHOD WITH TIME MULTIPLEXED POWER SUPPLY

[76] Inventors: Harry F. Hull, Rau Sao Benedito, 761, 04735 Sao Paulo; Ivan P. Da Silva, R. Dos Mainas, 30, 09790 Sao Bernardo Do Campo, SP, both of Brazil

[21] Appl. No.: 375,605

[22] Filed: Jul. 5, 1989

Related U.S. Application Data

[63] Continuation-in-part of Ser. No. 368,666, Jun. 20, 1989.

[51] Int. Cl.$^5$ .................. C25D 17/00; C25D 21/12
[52] U.S. Cl. .................. 204/228; 204/231; 204/406
[58] Field of Search .................. 204/228, 231, 406

[56] References Cited

U.S. PATENT DOCUMENTS

| | | | |
|---|---|---|---|
| 3,875,030 | 4/1975 | Richards et al. | 204/228 X |
| 4,100,036 | 7/1978 | Rode et al. | 204/228 X |
| 4,153,521 | 5/1979 | Litvak et al. | 204/231 X |
| 4,749,460 | 6/1988 | Komoto et al. | 204/228 X |

FOREIGN PATENT DOCUMENTS

| | | | |
|---|---|---|---|
| 0647363 | 2/1979 | U.S.S.R. | 204/231 |
| 0771198 | 10/1980 | U.S.S.R. | 204/231 |
| 0775197 | 10/1980 | U.S.S.R. | 204/231 |

Primary Examiner—Donald R. Valentine
Attorney, Agent, or Firm—Renner, Otto, Boisselle & Sklar

[57] ABSTRACT

Computerized apparatus for electrolytic processing of materials, includes an electrolytic processing bath, plural first electrodes, at least one second electrode, and a computerized power supply for supplying time multiplexed power to the electrodes. The power supply may include a pulse width modulator or a pulse position modulator and is operative to control the relative amounts of time that the respective electrodes are energized for electroplating, electropolishing, and the like. Current control and bath composition control are provided. Plural baths may be monitored and/or controlled by a single computer control. A method for electrolytic processing of materials includes placing plural first electrodes in an electrolytic processing bath, placing at least one second electrode in such bath, and using a computer to determine different respective times at which power is supplied between at least one of such first electrodes and such at least one second electrode.

32 Claims, 7 Drawing Sheets

ELECTROLYTIC PROCESSING APPARATUS AND METHOD WITH TIME MULTIPLEXED POWER SUPPLY

REFERENCE TO RELATED APPLICATION

The instant application is a continuation-in-part of co-pending U.S. Pat. application Ser. No. 07/368,666, filed June 20, 1989.

TECHNICAL FIELD

The present invention relates generally to electrolytic processing of materials, for example, electroplating and, more particularly, to alloy plating.

BACKGROUND

In the field of electroplating an article intended to be plated is placed in an electrolytic bath. The plating material, such as gold, zinc, nickel, silver or other material or a combination of materials intended to be plated onto the article, is dissolved in or is otherwise conveyed into an electrolyte which forms the electroplating bath. Often the plating material is derived from one or more anodes positioned in the bath. The anode is coupled to a power supply and the article intended to be plated also is coupled to the power supply and serves as the cathode in the electrolytic plating system. By applying an electrical potential difference/voltage between the anode and cathode a current flows therebetween through the electrolyte and the plating material migrates to the article intended to be plated. The amount of plating material actually plated onto the cathode/article intended to be plated is a function of the applied voltage, current flow through the electrolyte and current density at the article intended to be plated. When the current density varies at different parts of a particular cathode/article, the degree of plating there also will tend to vary correspondingly. Also, if current is switched on and off, laminar plating may occur, which often is undesirable. Laminar plating is a formation of layers rather than a homogeneous plating.

Current tYpicallY is a function of applied voltage and the impedance, as is well known. The impedance typically is a function of the efficiency of the electrodes themselves (including electrochemical equivalents thereof), of the impedance characteristics of the plating bath, and of the spacing of the electrodes in the bath.

It would be desirable to maintain a controlled and uniform current density at the cathode/article intended to be plated in order to achieve a desired controlled, uniform plating thereof.

One type of alloy plating uses the anodes themselves to contribute to the composition of the bath. In such case plural plating materials are applied to the article intended to be plated as an alloy or mixture of such plating materials. The problems encountered with non-uniform current density are further complicated by the additional factor that the concentration of plating material ingredients may vary with time, voltage, plating that forms on a particular anode or cathode, polarization of an anode, efficiency of the anode and/or cathode, current density, etc. For example, in one alloy plating system with respect to which the invention will be described in detail below, there may be multiple anodes, each of which contributes a separate ingredient into the electrolytic plating bath to form the plating material alloy. The concentration of one plating material relative to the other or others must be maintained in the electrolytic plating bath to obtain the desired constituency or relative concentrations of plating materials on the article intended to be plated. For example, to obtain a plated coating of an alloy of zinc and nickel on a metal article, say of a constituency of 88% zinc 12% nickel, it is necessary that the relative amounts of such zinc and nickel ingredients in the electrolytic bath be at approximately a 62/38 ratio or some other known ratio that is altered according to some function, such as a function of the ionic nature of the respective ingredients that is representative of the tendency of such material to plate onto the cathode/article, the operative efficiency of the anode(s) and/or cathode, etc., as is known. For example, it is known that one material may plate more readily than another due to the fact that there are more free electrons available in one than in the other or there is some difference between the ions as they travel through the electrolytic plating bath from the anode to the cathode.

However, as the concentration of one ingredient relative to the other (others) in the electrolytic plating bath changes, regardless of whether such concentration change is due to anode dissolving or some other reason, the ratio of those ingredients in the finished plating coating will change, which may cause a variation from specifications for the finished plated article. This, of course, is undesirable.

To alter the concentration relationship of the electrolytic plating bath to bring it back to the desired specification, it is necessary to increase the amount of one ingredient relative to the other. Such increase sometimes is brought about by changing, say increasing, the current/potential difference between the anode that is supplying such ingredient and the cathode. Such a change in current, though may cause a change in current density at the cathode if a corresponding adjustment in the current/potential difference between the other anode and the cathode is not made, which changes the uniform plating thereat and also can cause a difference in the amount of one ingredient that is plated onto the cathode/article relative to the amount of the other ingredient that is plated onto the cathode/article. Such a change in current also causes a potential difference between the anode whose voltage has been changed by increasing current there and the other anode which is supplying the other ingredient to the plating bath, thus possibly causing undesirable plating of the first ingredient onto the other anode, which in turn can cause an undesirable shift in operation, anode efficiency, and/or concentration in the electrolytic plating bath.

In other types of electroplating ingredients are directly added to the bath to obtain plating material therein. The invention is useful in such plating techniques.

Another type of electrolytic processing is known as electrolytic polishing or simply electropolishing. In electropolishing high points or roughness causing flaws in the surface of a material intended to be polished are removed to improve smoothness of the surface. In electropolishing the part intended to be polished is placed in an electrolytic bath and serves as one electrode of the electropolishing system. A second electrode also is placed in the bath. A potential difference of prescribed polarity is applied between such electrodes so that current flows from the part toward the other electrode. Due to the direction of current flow, the part is referred to as the anode, and the other electrode is referred to as the cathode. Since the high points on the part tend to concentrate current or at least tend to experience higher current density than the already smoother surface portions, material at the high points tends to be removed with the current flow, thus effecting polishing. The various problems encountered in electroplating also can detrimentally affect electropolishing.

The present invention helps solve the above problems and disadvantages encountered in prior electroprocessing systems and methods.

Another problem encountered in the past has been the tendency of some electroplating baths to grow or to increase in the amount of a particular ingredient therein or ratio of that ingredient compared to another. Sometimes additives have been added to the bath to control such growth, and sometimes inert (non-dissolving) electrodes (anodes) have been used to control such growth. The present invention described below may be used to control power to such control electrodes, i.e., the inert electrodes, therefore controlling the composition of the bath.

Further, in the past electrodes formed of an alloy material have been used to provide the desired concentration of alloy ingredients to an electroplating bath. One example is an alloy of tin and lead. Using the present invention, though, separate electrodes, one of tin and the other of lead, can be controlled to provide the desired concentration of ingredients to the plating bath.

As used herein anode, cathode or electrode may refer to one anode, cathode or electrode or to a group of anodes, group of cathodes or group of electrodes, as will be evident to those having ordinary skill in the art.

BRIEF SUMMARY OF THE INVENTION

Briefly, according to the present invention an electrolytic processing system and method provide and control power in a time multiplexed fashion.

Two examples of time multiplexing according to the invention include pulse width modulation of applied signals and frequency modulation (also known as pulse position modulation) of applied signals.

According to the invention the time multiplexing may be used to provide and with providing of current control, voltage control, or both. A preferred embodiment described in detail below provides current control while maintaining substantially constant current density at the cathode.

According to another aspect of the invention the concentration of ingredients, such as those derived from electrodes, can be controlled using the time multiplexing control features.

Most desirably, the invention provides a variety of control functions and/or capabilities while maintaining constant or substantially constant current density at the cathode to help assure uniformity of plating.

Various other features of the invention, as are described herein, may be employed in electrolytic processing systems and processes, such as in electroplating, and especially in alloy plating, in electropolishing and in other systems.

The foregoing and other objects, features, aspects and advantages of the present invention will become more apparent as the following description proceeds. It will be appreciated that while a preferred embodiment of the invention is described herein, the scope of the invention is to be determined by the claims and equivalents thereof.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

BRIEF DESCRIPTION OF THE DRAWINGS

In the annexed drawings.

DESCRIPTION OF THE PREFERRED EMBODIMENT

Figure 1:
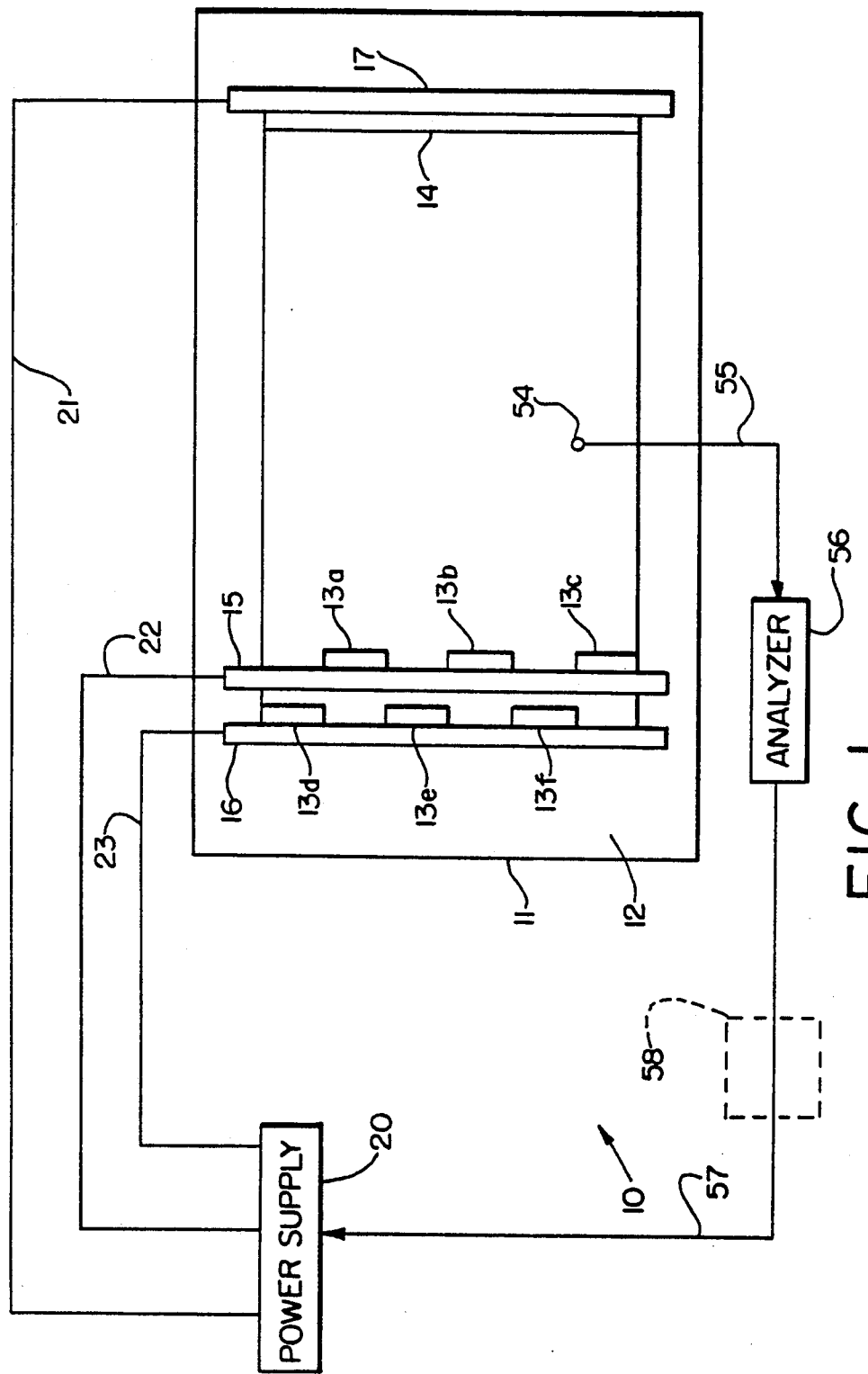
FIG. 1 is a schematic illustration of an electroplating apparatus in accordance with the invention.

Referring, now, in detail to the drawings, wherein like reference numerals designate like parts in the several figures, and initially to FIG. 1, an electroplating apparatus in accordance with the present invention is generally designated 10. The apparatus 10 includes a tank 11 containing an electroplating bath 12 in which are located plural anodes 13a through 13f. More or fewer anodes may be used. For alloy plating at least two or more of the anodes may be of different materials so that such respective anodes deposit such respective materials into the electroplating bath 12. The quantity of material (usually metal) deposited by an electrode (typically the anode) in an electroplating bath is a function of the anode efficiency, the number of coulombs or coulomb-seconds, the bath composition, and/or the electro-chemical nature of the material of which the electrode is constituted. The material of which such bath is formed may be a conventional electrolyte. The material of which such anodes are formed may be conventional materials used for electroplating; exemplary materials are zinc and nickel. Other ingredients, additives and the like also may be included in the bath as is conventional.

Placement of the anodes in the bath 12 may be according to usual convention as a function of deposition of a plated coating on a cathode 14. The cathode 14 in fact preferably is the article intended to be coated. The cathode 14 may be a single cathode or may represent several cathodes.

If the apparatus 10 were used for electropolishing, for example, then the part to be polished would be the anode and the other electrode(s) would be the cathode(s), as is well known.

In the preferred embodiment several of the anodes 13a-13c are supported from a common electrically conductive support anodes 13d-13f are supported from a second common electrically conductive support bar 16. The support bars 15, 16 may be of copper or other conventional material. The anodes 13a-13c may be of nickel and the anodes 13d-12f may be of zinc More or fewer anodes may be used and they may be of more than two materials when alloy plating, depending on the nature of the plating material. Also, if desired, the anodes may be of the same material when the plating is to be of only one material, i.e. an embodiment of the invention in which the plating may not necessarily be alloy plating. Further, one or more of the electrodes may be inert or non-dissolving, especially when used to control growth of an ingredient in a bath and/or to effect plating when the plating material is added to the bath from a source other than an anode.

The cathode 14 may be a single article or several articles intended to be plated. Such cathode 14 may be supported from a single electrically conductive support bar 17, for example of copper or other material, or from several such bars. As is well known, the anodes and cathode preferably are strategically located in the plating bath 12 relative to each other in order to obtain a particular current density at various portions of the cathode and, thus, particular plating characteristics at those portions. The support bars 15, 16, 17 may be suspended from rails 18 or by come other conventional mechanism used in an electroplating system to position the electrodes 13, 14 in the plating bath 12.

It will be appreciated that although the invention is described and illustrated in detail for electroplating an article 14 that remains placed in a single location in the bath 12, the features of the invention also may be employed for strip plating.

An electrical power supply 20 according to the invention is coupled to supply electrical power to the anodes and cathode. More specifically, such power supply is coupled by a conductor 21 to the cathode 14 and by respective conductors 22, 23 to the respective groups of anodes that are respectively supported from the electrically conductive support bars 15, 16, as is illustrated in FIG. 1. The power supply provides a potential difference or voltage between the cathode 14 and one group of anodes 13a-13c at one period of time and between the cathode 14 and the other group of anodes 13d-13f at a different period of time. Preferably the power supply 20 supplies current to flow between the cathode and the respective anodes to cause plating on the cathode. Since the power supply preferably is directly coupled to supply power to the electrically conductive support bars 15, 16, 17, such support bars also will be referred to below for convenience as the power outputs or power output terminals of the power supply.

According to the invention, the power supply 20 provides electrical power in a time multiplexing type of procedure. Such time multiplexing is carried out using pulse width modulation techniques according to one embodiment. Such time multiplexing can be carried out using frequency modulation (and/or pulse position modulation) techniques according to another embodiment. Other time multiplexing techniques that provide functions similar to those disclosed also may be used.

What preferably is meant by time multiplexing is that for a particular time period a voltage is applied between the conductors 21 and 22, for example, thereby providing voltage between the cathode 14 and the first group of anodes 13a-13c and causing current flow therebetween; and for the same or a different length of time, but in any event at a different moment in time, a voltage is applied between the conductors 21 and 23 thereby providing a voltage between the cathode 14 and the second group of anodes 13d-13f and causing current flow therebetween. Also, according to the preferred embodiment of the invention, current control is provided so that the current flow preferably remains constant, regardless of whether it is flowing between the cathode and the first group of anodes or between the cathode and the second group of anodes. Therefore, the current density at the cathode remains constant when current is applied.

Since the current density at the cathode remains substantially constant, uniform plating in a controlled fashion can be achieved. Indeed, depending on the set up, e.g., the positional arrangement, efficiency and size of the respective anode(s) relative to the cathode(s), different current densities and, thus, plating characteristics, can be obtained in substantially repeatable fashion.

The actual process or electrochemical mechanism of electrolytic plating at the cathode occurs as it does in conventional electroplating processes. Plating material in the bath plates on the cathode 14 when current flows between anode(s) and the cathode. The actual current and voltage, as well as current density, employed during electroplating using the invention may be selected according to conventional electroplating processes. For example, the actual current may be from less than one amp to thousands of amps or even in the million-amp range. The voltages would, of course, be a function of current and impedance between respective electrodes in the plating bath, as is well known.

Moreover, by changing the length of time that each anode or group of anodes is energized, i.e. has a voltage applied between such anode(s) and the cathode 14 and is the source of current in the bath 12, the concentration of the ingredient supplied to the plating bath 12 by such anode(s) relative to the ingredient supplied by the other anode(s) of a different material can be controlled. Especially, the ratio of such ingredients in the bath can be maintained substantially constant. Also, as the efficiency of one electrode changes, e.g., due to some plating material or the like depositing thereon, corrections can be made by the power supply 20 altering such respective lengths of time to continue maintaining uniformity of the plating bath composition. Therefore, the nature of the alloy plated coating on the cathode can be closely controlled.

As a corollary, if desired, over a period of time, the concentration of one ingredient in the bath 12 can be changed relative to the other or other ingredients, thereby to provide an alloy plated coating on the cathode that varies in a specified manner through the thickness of the coating, for example.

According to the preferred embodiment, the actual length of time that each anode or group of anodes is on, i.e., energized or receiving power, may be set by the user in order to obtain the desired plating operation and/or plating characteristics on the article being plated. However, the relative amount of time that each anode or group of anodes is on relative to the other(s) can be set or controlled manually or automatically to maintain a desired composition of the plating bath preferably while maintaining constant current density during plating, i.e., when power is on.

It will be appreciated that although the invention is described in detail with respect to alloy plating, features of the invention may be employed in other electroplating systems, electropolishing systems and other electrolytic processing systems.

Figure 2:
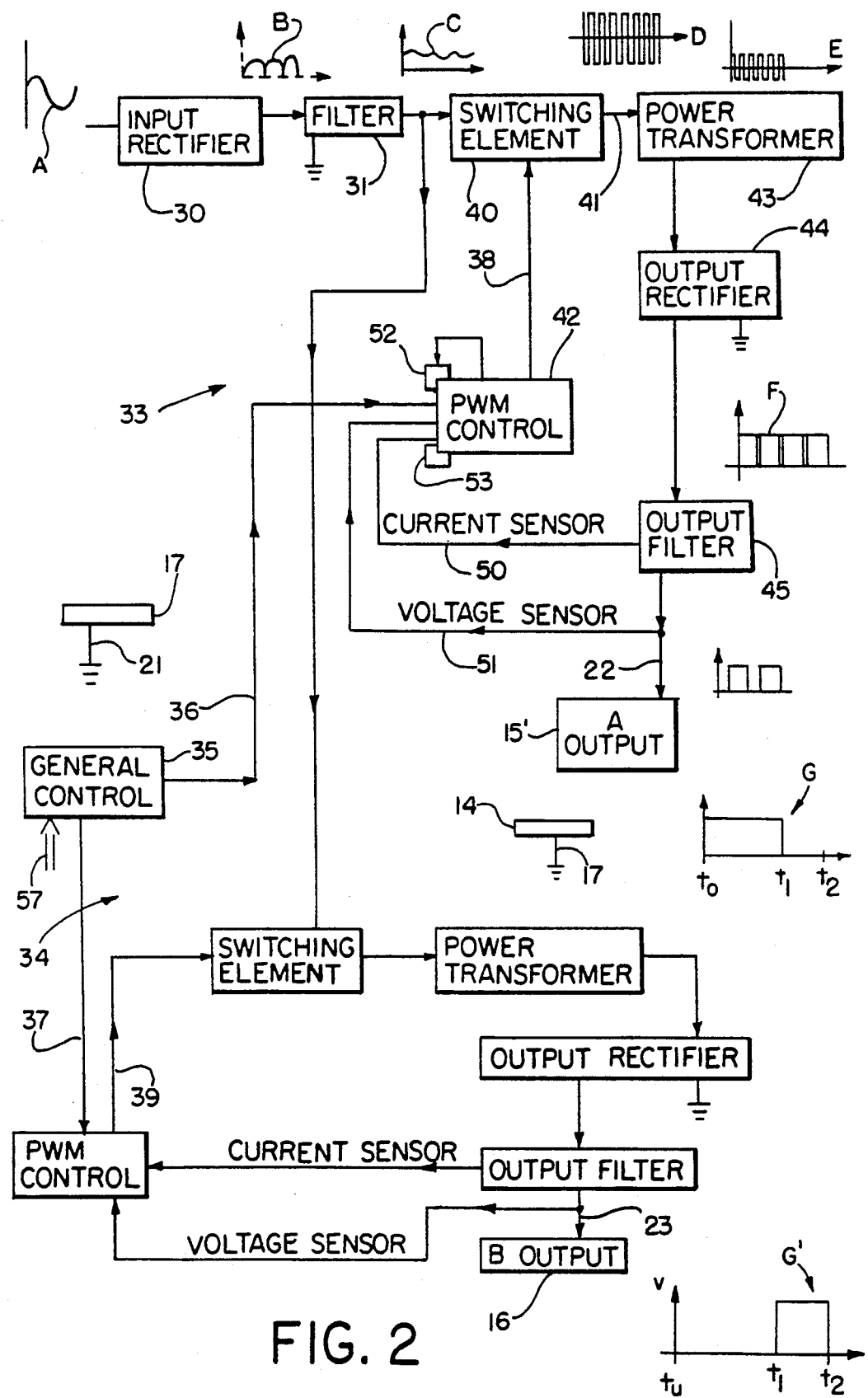
FIG. 2 is a schematic electric circuit block diagram of a power supply in accordance with the invention.

Turning to FIG. 2, a block diagram of a power supply circuit 20 useful in the invention is illustrated. The circuit 20 includes an input rectifier 30 which receives input AC electrical power A. The various exemplary signals occurring in the circuit 20 are designated by alphabet letters. Such signals are illustrated as examples, but other shapes of signals and other signals also may be employed. Also, the signal wave shapes are provided only to facilitate the explanation of the circuit, and values are not indicated. The values would depend on the particular apparatus 10 and the power required to accomplish the desired plating function.

Preferably such rectifier 30 is a full wave rectifier which rectifies the input AC power A (e.g., from the utility company) to provide full wave rectified power B. A filter 31 filters the full wave rectified power to provide a substantially continuous DC signal C having a particular amplitude. The rectifier 30 and filter 31 may be eliminated in the event that another source of power, such as a DC source, were provided to node 32 or even elsewhere in the power supply circuit 20. Also, although the invention is described in detail below relative to a circuit that operates on a DC power input supplied to node 32, the features of the invention may be employed in a circuit that operates based on AC power input supplied to node 32 by altering the below described various components and interrelationships thereof of the power supply switching circuits 33, 34, as will be evident to those having ordinary skill in the art.

Switching circuits 33, 34 preferably are identical or substantially identical. The purpose of the switching circuits 33, 34 is to provide voltage between the cathode 14 and the respective anodes 13. Accordingly, the switching circuit 33 provides voltage on conductor 22 to the power output terminal (support) 15 for energizing anodes 13a-13c; and the switching circuit 34 provides voltage on conductor 23 to the power output terminal (support) 16 for energizing anodes 13d-13f. Such voltage or energization is with respect to the cathode 14, which is coupled to ground or to some other source of reference voltage potential at power output terminal (support) 16 (not shown in FIG. 2).

The switching circuits 33, 34 are operated by a general control 35, which determines when and for how long each switching circuit will be enabled to energize the anodes connected thereto. Preferably the general control 35 assures that only one group of anodes will be energized at a particular time.

The general control 35 may be, for example, a conventional free running oscillator that is controllable to determine when and for how long each switching circuit is on. The general control 35 also may be some other device. The general control 35 may change the relative lengths of time that the switching circuits 33, 34 are enabled in order to maintain a desired bath composition, while the switching circuits are operative to maintain constant or otherwise controlled current density. Exemplary period of operation of the general control 35 may be from as long as 15 seconds to as short as 100 microseconds, and the relative duty cycles of energizing the switching circuits 33, 34 would, of course, be less than that period.

Each switching circuit 33, 34 preferably is the same. Therefore, only the circuit 33 will be described in detail. The circuit 33 includes a switching element 40 that is able to switch power on and off as it is received from the node 32. Such switching element 40 may be for example a conventional power field effect transistor, one type of which is sold under the trademark HEXFET or a bridge of FET's coupled to energize the power transformer in conventional manner. Whether the switching element 40 is passing electrical power to conductor 41 or not is determined by a conventional pulse width modulator control circuit (PWM) 42 when PWM 42 is selectively and sequentially enabled by the general control 35. The output signal produced by the general control 35 is delivered on lines 36, 37 to the PWM circuits 42 in the respective switching circuits 33, 34. Such output signal has frequency and duty cycle characteristics that can be adjusted or controlled automatically or manually, e.g., to determine and to control the composition of the bath 12. The signals on lines 36, 37 are preferably complementary so that when one is on to enable a respective PWM 42, the other is off, and vice versa.

The PWM 42 may be an integrated circuit part No. 3524. Such part includes an oscillator. Therefore, when the PWM 42 is enabled by the general control 35, such PWM produces an AC output signal on line 38 (line 39 in the switching circuit 34). An exemplary frequency for such AC output signal on lines 38 and 39 may be on the order of about 100 KHz. The duty cycle or pulse width of such AC signal can be controlled to control current or voltage at the anode(s) energized by the respective switching circuit 33, 34 in which the PWM 42 thereof is coupled as is described further below. When the PWM 42 in a particular switching circuit 33,34 no longer is enabled by the general control 35, it stops providing the indicated AC signal; at that time preferably the other PWM 42 in the other switching circuit produces its AC signal. The respective PWM circuits 42 drive the respective switching elements 40 in the switching circuits 33, 34.

The output signal D from the switching element 40 is approximately a square wave signal of relatively high frequency compared to the frequency of the input AC power A. The pulse width of such square wave signal is determined by the PWM 42; the frequency may be controlled by the general control 35. Such relatively high frequency square wave signal can be transformed by a power transformer 43 to a desired output voltage signal E of, for example, twenty-four volts peak to peak. As is well known a high frequency signal usually can be transformed more efficiently than can be a relatively lower frequency signal, and this preferably is taken into consideration in determining the frequency with which the switching element is switched.

An output rectifier 44 is coupled to receive the signal E from the transformer 43. The output rectifier 44 preferably is a full wave rectifier which provides a substantially constant magnitude full wave rectified output voltage F. The rectified voltage F is filtered by an output filter 45 to provide a substantially constant DC voltage on line 22 whenever the full wave rectified voltage F is received. Since the switching element 40, transformer 43, and output rectifier 44 are operating on AC generally square wave signals, the nature of the voltage at the output of the filter 45 supplied to conductor 22 will be a substantially constant, i.e unvarying, DC voltage relative to the source of ground reference potential 46, for example taken back at the input filter 31. (The signal G' is shown at output 16 from switching o circuit 34. Signals G and G' are out of phase so when one is on the other is off, as is seen by indicated times $t_0$ to $t_1$ for signal G and times $t_1$ to $t_2$ for signal G'.)

The output filter 45 is coupled by a current sensor feedback line 50 to the PWM 42; and the line 22 is coupled by a voltage feedback line 51 to the PWM 42. Such feedback signals on lines 50, 51 provide control functions to the PWM 42 to help assure that the voltage at line 22 is maintained constant and that the current flow from the energized anodes remains uniform and constant as the respective switching circuits 33, 34 energize respective anodes coupled to respective power outputs 15, 16. Current and voltage adjustments 52, 53 may be set by the user and/or automatically to establish the desired current, current density and/or voltage that the PWM 42 attempts to maintain in the bath 12. Provision for such current and voltage adjust inputs are included in the 3524 integrated circuit, as is well known. For example, to maintain a particular current, the current sensor line 50 provides an input to the PWM 42 which in turn adjusts the duty cycle of the AC signal on line 38, i.e., the percentage or ratio of on time and off time in each on/off cycle of the switching element 40 as driven by the PWM 42. Current in the bath will be a function of such percentage or ratio.

The power supply 20 operates, as follows. Input power is supplied to the input rectifier 30. That power is full wave rectified by the filter 31 and is provided at node 32 to the switching circuits 33, 34. The general control 35 determines when and for how long each of the switching circuits 33, 34 will be operative to energize the respective anodes coupled to the outputs 15, 16 thereof. Ordinarily, when one switching circuit is energizing the anodes connected thereto, the other is off, and vice versa. The pulse width modulator control 42 in each switching circuit 33, 34 operates the switching element 40 thereof when energized to produce the signal D at a pulse width relation determined by the settings of the PWM and the current and/or voltage feedback on lines 50, 51 and over a period of time determined by the general control 35. That signal D is transformed by the high frequency power transformer 43 and is full wave rectified by the output rectifier 44. The full wave rectified signal is delivered via an output filter 45 in each switching circuit to the respective power output 15 (for switching circuit 33), 16 (for switching circuit 34).

In accordance with the invention the switching circuits 33, 34 are operative so that the current flow from the respective anodes coupled to the respective outputs 15, 16 will be constant and uniform so that the current density at the cathode remains constant regardless of the particular output 15 or 16 that is being energized at any given time. Further, by altering the amount of time that one anode or group of anodes is energized relative to the amount of time that another anode or group of anodes is energized, the concentration of ingredients supplied to the electroplating bath by the respective anodes can be controlled and/or altered.

The present invention is particularly suited to automated control, for example, of bath composition. Thus, a sampling tap 54 may obtain sample material in the bath 12 and deliver such sample continuously or periodically via a flow line or other means 55 to an analyzer 56. An exemplary analyzer may be a conventional X-ray fluorescence analyzer, which detects bath composition.

Other analyzers may be used, as will be appreciated. Information concerning bath composition may be coupled electrically by electrical connection 57 to the power supply 20 as is seen in FIG. 1. Such electrical connection 57 may be provided as an input to the general control 35 to cause the general control to change or to maintain the relative amounts of time that the switching circuits 33, 34 are respectively enabled, thereby to control bath composition. If desired, conventional interface and/or control circuitry, possibly including a computer, may be coupled between the analyzer 56 and the power supply 20, as is represented at 58, to decode output information from the analyzer for control use at the power supply.

Figure 3:
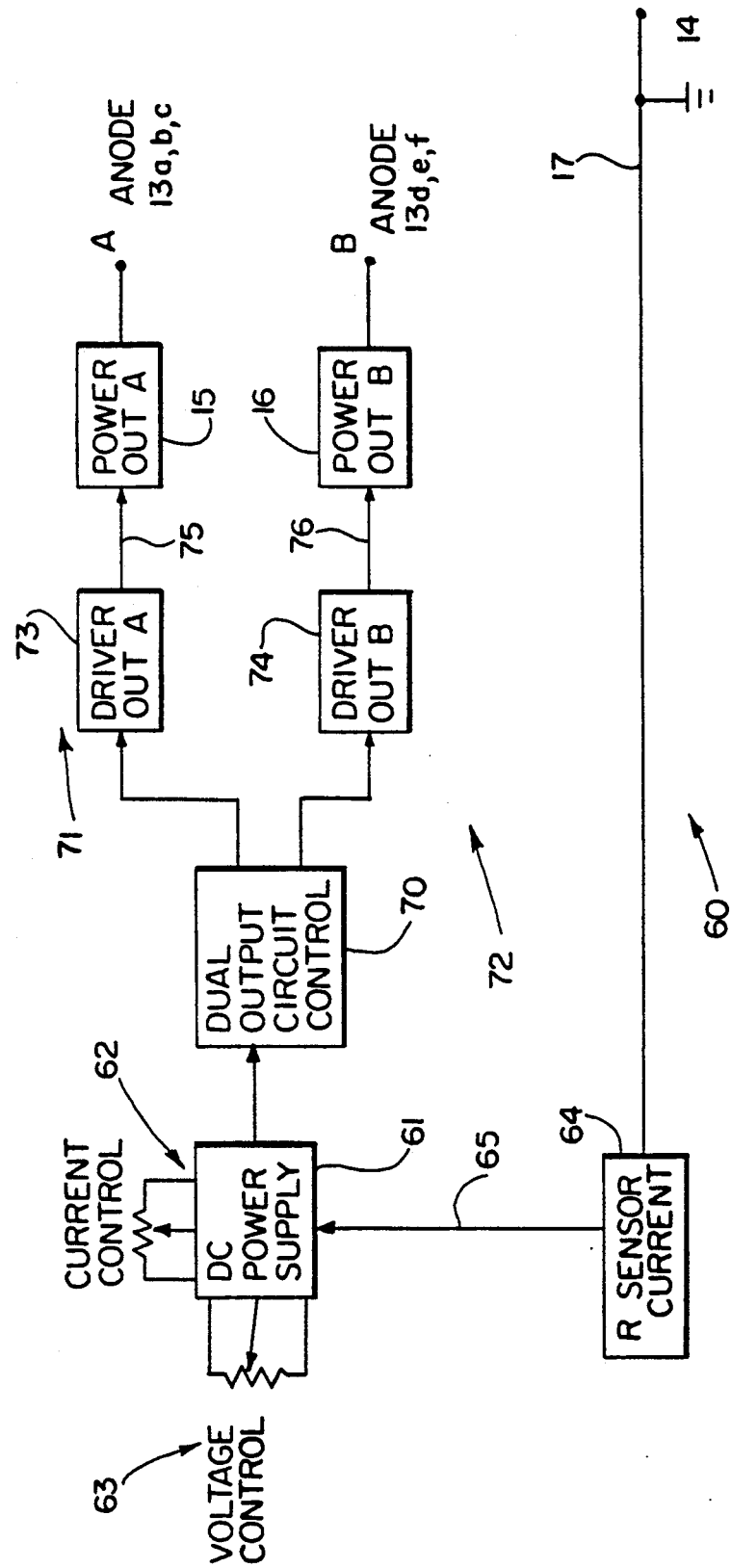
FIG. 3 is a schematic electric circuit block diagram of another power supply useful in accordance with the invention.
Figure 4:
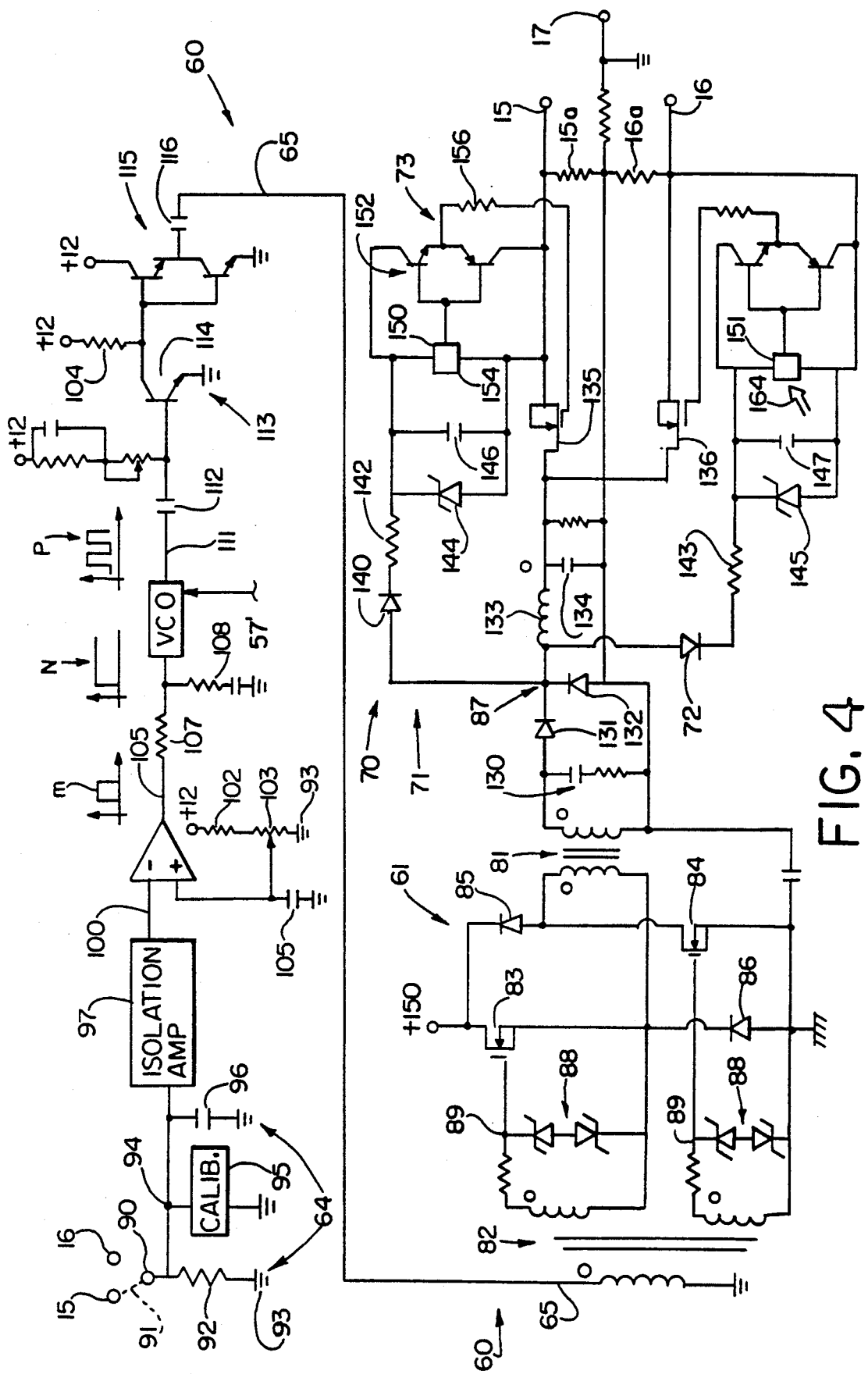
FIGS. 4 and 5 are schematic electric circuit diagrams of the power supply of FIG. 3.

Although the power supply 20 uses a single input rectifier 30 and filter 31, it will be appreciated that each of the switching circuits 33, 34 may be supplied with electrical power from a separate input rectifier and associated filter or other circuitry from a common or separate supplies of power. Also, although separate power transformers 43 are used in each switching circuit 33, 34, the invention may use a single power transformer 43 shared by both circuits 33, 34, an example being in the power supply circuit 60 of FIG. 3. Therefore, the embodiment of FIG. 2 depicts switching of power before the power transformer and the embodiment of FIGS. 3 and 4 depict switching of power after the power transformer. The power supply 60 may be substituted for the power supply 20 in the apparatus 10 of FIG. 1. It will be appreciated that other types of circuitry may be employed in accordance with the present invention to accomplish the time multiplexed type of operation of the electrodes in an electrolytic materials processing system.

Turning to FIG. 3, another power supply 60, which may be used in accordance with the present invention, to supply power to plural groups of anodes coupled to power outputs 15, 16, respectively, such as anodes 13$a$–$c$ connected to output 15 and anodes 13$e$–$f$ coupled to output 16 in FIG. 1. The power supply 60 includes a DC power supply that has both current control and voltage control capability represented by potentiometers 62, 63, respectively. A current sensor 64 senses the current flow at the cathode 14, which is coupled to the conductor output 17, and provides an input on line 65 to the DC power supply 61. Such current sensor input may be used by the power supply 60 to maintain constant current during plating operation.

The power supply 60 includes a dual output circuit control 70, which is described in greater detail below with respect to FIGS. 4 and 5. The dual output circuit control 70 is coupled to a pair of output channels 71, 72 and determines which is selected at any time to operate through respective driver output circuits 73, 74 to provide power via lines 75, 76 to the respective power outputs 15, 16. Details of the output channels 71, 72 and of the circuit 60 as a whole are described in detail with respect to FIGS. 4 and 5. Fundamentally, though, it will be appreciated that the DC power supply 61 provides a source of DC power to the dual output circuit control 70. Such circuit control 70 selects which of the output channels 71, 72 is to be energized and cooperates with the respective driver output circuits 73, 74 to supply power at a desired level to the respective power outputs 15, 16 and, accordingly, to the several anodes, respectively. The power supply 60 may include more than two output channels.

Referring to FIG. 4, a schematic electric circuit diagram of the power supply 60 is illustrated. The power supply 60 includes a DC power supply portion 61, the dual circuit control 70, driver outputs 73, 74, and a current sensor portion 64. Such components cooperate to provide desired power at power outputs 15, 16 coupled to the respective anodes relative to the power output 17 coupled to the cathode. In FIG. 5 is illustrated a portion of the driver output circuitry, as will be described further below.

The DC power supply 61 includes a high voltage power input 79, for example, of 150 volts or other voltage level as may be desired, such as a DC power input from a conventional source of DC voltage (not shown), and a chassis ground connection 80. The DC power supply 61 couples power via a transformer 81 to the output channels 71, 72. The current sensor circuitry 64 is coupled via a transformer 82 to the DC power supply 61 in order to control the same. The preferred form of control is in such a fashion that the current provided at the terminals 15, 16 relative to the terminal 17 will remain substantially constant and uniform regardless of which output channel 71, 72 is energized and, accordingly, regardless of whether current is flowing from the output terminal 15 relative to the cathode terminal 17 or from the output terminal 16 relative to the cathode terminal 17.

In the DC power supply 61 are included a pair of power field-effect transistors (FET), such as those sold under the trademark HEXFET, 83, 84 and a pair of diodes 85, 86, which are connected relative to each other and relative to the two secondaries in the transformer 82 and the primary in the transformer 81 in full wave bridge configuration. The FETs 83, 84 are operated such that both are on at the same time or both are off at the same time. As is evident from the illustration in FIG. 4, by periodically turning the FETs 83, 84 to conductive or on state, current flows through the primary of the transformer 81 in one direction, and when the FETS 83, 84 are turned off, diodes 85 and 86 demagnetize the transformer 81. Depending on the nature of the signal provided the primary of the transformer 82 from the current sensor circuitry 64, the magnitude of current in the secondary of the transformer 81 is controlled. Therefore, when more or less current is desired at one of the power outputs 15, 16, the DC power supply 61 increases or decreases the power coupled by the transformer 81 which in turn is provided at node 87 for coupling into the respective output channels 71, 72. The actual signal at node 87 is a pulsating voltage signal. The frequency of the voltage pulses at node 87 may be changed under control of the feedback current sensor 64 depending on whether more or less current or power is needed at the power output terminals 15, 16.

Zener diode circuits 88 may be coupled across the drain and source electrodes of the FETs 83, 84 for usual protective purposes, limiting the voltage drop therebetween. Also, resistors 89 may be coupled in circuit with the secondaries of the transformer 81 and the respective zener diode circuits for conventional protective purpose limiting current in the diodes.

To develop the current control signal provided by the current sensor circuitry 64 to the DC power supply 61, an input terminal 90 is coupled to a selected one of the power output terminals 15, 16. Either one may be used or both may be used. For illustrative purposes, a jumper 91 is shown connected to the power output terminal 15. An accurate current sensor resistor 92 is coupled between the input terminal 90 and the circuit ground 93, and a voltage then is developed on line 94 representative of the current flowing at the power output terminal 15. A conventional display 95 is coupled to the line 94 to display an indication of the actual current flow from the selected power output terminal 15 or 16. The display 95 preferably includes a calibration circuit to provide full scale calibration. A capacitor 96 conducts high frequency signals on line 94 to the circuit ground 93. Moreover, a coupling and isolation amplifier 97 amplifies the signal on line 94 and provides the same as a voltage on line 100 to a comparator 101, which is formed by an operational amplifier. The voltage on line 100 is coupled to the inverting input of the comparator 101. A reference voltage is supplied to the non-inverting input. The reference voltage is developed across a resistor 102 and a potentiometer 103, which are coupled between the circuit ground and a source of voltage, such as the $V_{cc}$ voltage of 12 volts provided form the conventional circuit power supply (not shown) coupled at terminal 104. A capacitor 105 stabilizes the input voltage supplied to the non-inverting input of the comparator 101. The potentiometer 103 is referred to as the current setting potentiometer, for by adjusting that potentiometer, the magnitude of current supplied at the output terminals 15, 16 can be adjusted (set), as will be evident from the following description.

The output voltage M on line 106 at the output from the comparator 101 ordinarily will be a logic 1 or a logic 0 level, i.e., on or off, depending on whether the current at the power output terminal 15, 16, which had been selected by the jumper 91, is greater or is less than the current setting adjustment of the potentiometer 103. As the current at the selected output terminal 15, for example, periodically exceeds or does not exceed that current established in the current setting potentiometer 103, the signal M will take a characteristic of sometimes being on and sometimes being off. The signal M is coupled via a resistor 107 and a resistor-capacitor circuit 108 to the input of a voltage controlled oscillator (VCO) 110. The resistor 107 and the RC circuit 108 cooperate to convert the signal M to a DC voltage level signal represented at N.

The voltage controlled oscillator 110 produces an AC output signal P on line 111. The frequency of the signal P is a function of the magnitude of the voltage of the signal N. Therefore, as the comparator 101 detects that the current at the selected power output 15, for example, is closer to or is further from the desired current as determined by the setting of the potentiometer 103, the voltage N at the input of the VCO will change and the frequency of the signal P on line 111 will vary correspondingly. Preferably, the voltage controlled oscillator 110 is a linear voltage controlled oscillator that always provides the signal P such that there is a 50% duty cycle of the output signal P even though the frequency of the signal P may vary. Therefore, in each full cycle of positive-going and negative-going portions of the signal P, the duration of each positive-going portion will be the same as the duration of each negative-going portion for the particular frequency of the signal P.

The signal P is coupled via a capacitor 112 to the input of a transistor circuit 113, which functions in a sense as a one-shot multivibrator. The purpose of circuit 113 is to prevent saturating the transformer 82. In particular, if the frequency of the signal P is large enough, it will operate via the transistor 114 and the pair of amplifying transistors 115 to be coupled through a capacitor 116 to line 65, thus providing an AC signal to the primary of transformer 82. The frequency of the signal on line 65 will be increased or decreased as a function of whether current at the power output 15, for example, requires increasing or decreasing.

The multivibrator function of the transistor circuit is achieved by a bias circuit 120 which includes a resistor 121 a capacitor 122, and potentiometer 123. The circuit 120 and the potentiometer 123 cooperate with the capacitor 112 to assure the length of any pulse delivered by the transistors 113, 115 to the transformer 82 will be short enough that the transformer 82 will not saturate.

When the output from the VCO is of high enough frequency, such signal passes through capacitor 112 and directly drives the transistor 114. However, when such frequency is relatively slow compared to the time constant of the capacitor 112 and the resistance setting of potentiometer 123, such capacitor and potentiometer cooperate to limit the pulse width of the signal delivered on line 65 to the transformer 82 to one that appears as having a frequency that is large enough to avoid saturation of the transformer. For example, transistor 114 is biased to conduction to hold transistors 115 off. When a negative going pulse begins on output 111 from VCO 110 (such as the VCO portion of an integrated circuit No. 4046), transistor 114 turns off and transistors 115 turn on sending a signal to transformer 82. If the VCO output on line 111 does not return to a high or relatively positive level (relative to the mentioned negative going pulse), the capacitor 112 charges in time according to the RC time constant with resistance of potentiometer 123 to a level that again biases transistor 114 on and transistors 115 off. Such time constant is adequately fast to assure that transformer 82 will not saturate.

The pulsating voltage at node 87 is derived from the output of the secondary of transformer 81, RC filter 130 and diodes 131, 132. Such pulsations voltage is the source of current that will be provided drive outputs 15, 16. Voltage at the node 87 is provided via a conventional inductor 133 and capacitor 134 LC filter, which provides a DC voltage level at node 87. Due to the operation of the LC filter, the magnitude of the DC voltage at the node 87 will be a function of the frequency of the voltage pulses at node 87. The voltage at node 87 is supplied to the inputs of a pair of power FETs 135, 136. The control inputs of the respective FETs are coupled to control lines 137, 138. When a signal is on a respective line 137, 138, the respective FET provides to the respective power output terminal 15, 16, current flow to energize the respective anodes coupled to such power output terminals. The driver output circuits 73, 74 generate such control signals for delivery on lines 127, 138 to the FETs 135, 136, as now will be described.

Since the invention provides for operation of the circuit 60 in current control mode, whereby the current output at output terminal 15, for example, is maintained constant due to feedback through the current sensing resistor 92 and current sensor circuitry 64, the magnitude of the voltage at node 87 will be a function of the actual load, e.g., the load across the terminals 15 and 17 (and any additional load, such as that provided by the resistors 15a and 16a). The load across terminals 15, 17 is a function of the impedance of the electroplating bath 12 and the spacing of the anodes and cathode. Resistors 15a and 16a provide protection by supplying a finite load for the circuit in case the anodes and cathode are not in the bath when the power supply circuit 60 is on.

The voltage at node 87 is coupled via diodes 140, 141, resistors 142, 143, Zener diodes 144, 145, capacitors 146, 147 to a photosensitive module 150, 151 of a conventional opto-isolator and to a transistor output circuit 152, 153. Referring to the output channel 71, when a light input, which is represented by arrow 154, is supplied to the photosensor 150, the latter produces a signal on line 155 to provide a signal via the transistor circuit 152 and resistor 156 to the line 137 turning on the FET 135. The FET 135 then delivers current to the power output terminal 15. Similar operation occurs in the output channel 72 when light 164 is provided the photosensor 151, which then provides a signal on line 165 to cause the transistor circuit 153 to produce a signal via resistor 166 onto the control line 138. The FET 136 then turns on to provide current to the power output terminal 16.

Figure 5:
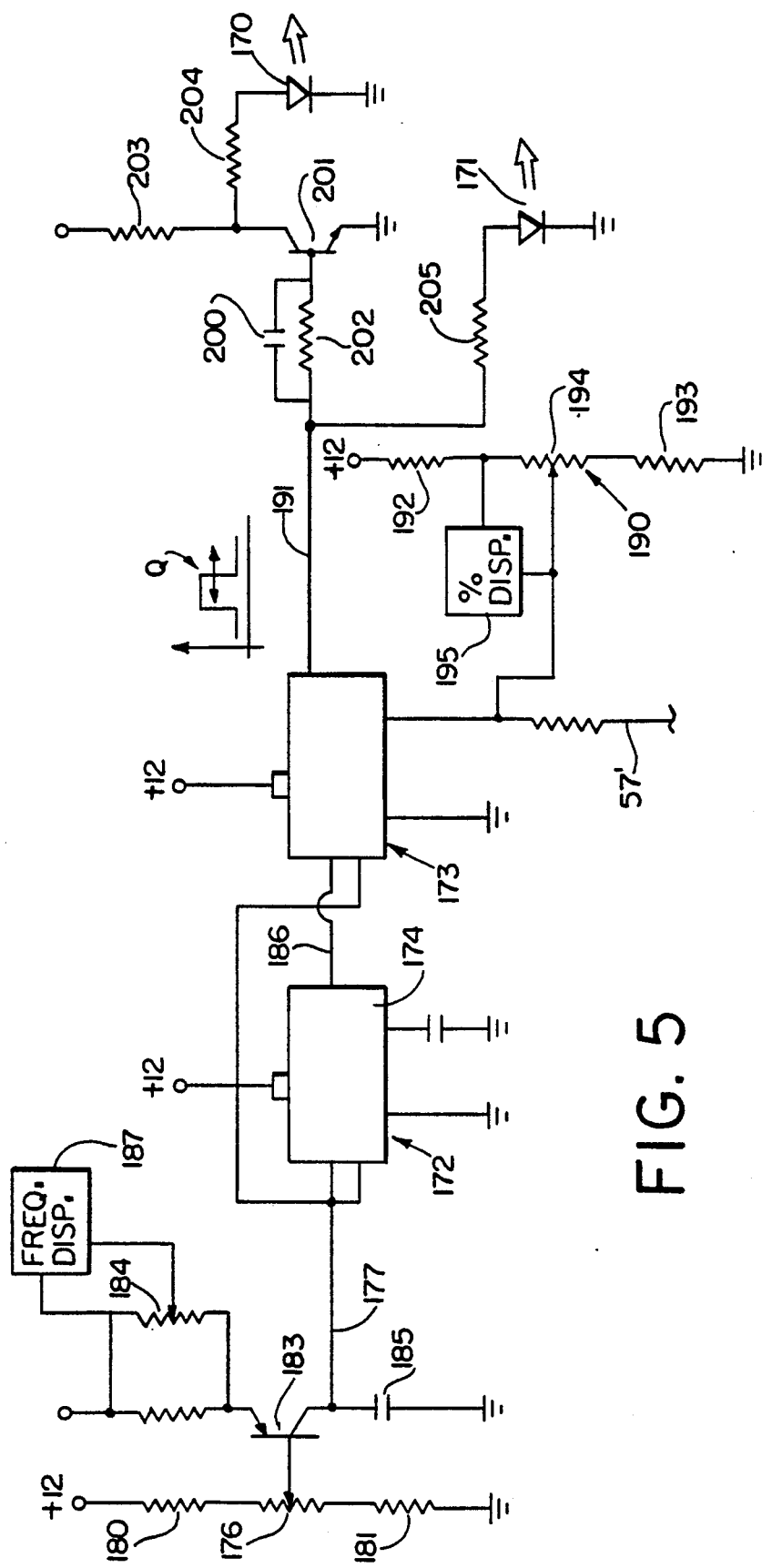

The optical signals 154, 164 are developed in the dual output circuit control 70 portion illustrated in FIG. 5 and, more particularly, in fact are emitted by respective light emitting diodes 170, 171 of respective opto-isolators that include the respective photosensors 150, 151. The circuit 70 includes a pair of timing circuits 172, 173, each of which may include a conventional 555 integrated circuit timer 174, 175 connected generally in the manner illustrated. The timing circuit 172 determines the cycle frequency of the dual output circuit control 70. The timing circuit 173 determines the relative duty cycle of the two portions of the signal which makes up an entire cycle; specifically, the timing circuit 173 determines what proportion of each complete cycle the light emitting diode 170 emits light and what proportion of the complete cycle the light emitting diode 171 emits light.

To establish the cycle frequency, an input circuit 176 is coupled via line 177 to an input of the timing circuit 172. The input circuit 176 includes several resistors 180, 181 and a potentiometer 182, all of which are coupled in series between the $V_{cc}$ power supply 104 and the circuit ground 93. The wiper arm of the potentiometer 182 is connected to the base of a transistor 183, which in turn is connected in a charging circuit that includes a resistor 184 and a capacitor 185. Depending on the setting of the potentiometer 182 and the values of the resistor 184 and capacitor 185, such capacitor 185 will charge at a prescribed rate that will determine the frequency of the signal produced on the output 186 of the 555 timer 174. Current flow through the resistor 184 represents the frequency of such signal on line 186 and can be monitored and displayed by a conventional display, such as a liquid crystal display, represented at 187.

The input line 177 and the output line 186 for the 555 timer 174 are coupled to inputs of the 555 timer 175. Moreover, a control input circuit 190 is coupled to another input of the 555 timer 175 to determine the portion of each full cycle of output signal Q produced on output line 191 from the 555 timer 175, that is, at a logic 1 or "on" level and what portion is at a logic 0 or "off" level. The input control circuit includes a series connection of a pair of resistors 192, 193 and a potentiometer 194. By adjusting the wiper arm of the potentiometer 194, the percentage or proportion mentioned can be changed. Since the voltage drop between the potentiometer wiper arm and one other terminal of such potentiometer represents such percentage or proportion, that voltage can be monitored and displayed, for example, in a conventional liquid crystal display, which is represented schematically at 195.

Output line 191 is coupled to a complementary output circuit 200, which decodes the signal Q so as to turn on the light emitting diode 170 to emit light when the signal Q exhibits a logic 0 or off state and to turn on the light emitting diode 171 when the signal Q exhibits a logic 1 or on state. The complementary output circuit 200 includes a transistor 201, which is coupled via an RC circuit 202 to the line 191, a resistor 203, which is coupled to the $V_{cc}$ voltage source 104, and a resistor 204, which is coupled to the light emitting diode 170. When the signal Q on output line 191 from the 555 timer 175 is at logic 0 level, the transistor 201 is not conducting; therefore, current can flow from the $V_{cc}$ source 104 via resistors 203, 204 through light emitting diode 170 to cause the latter to emit light. Since the signal Q is at a logic 0 level, the light emitting diode 171 will not emit light. However, when the signal Q is at a logic 1 level, such signal will bias the transistor 201 to an on or conducting condition so as to shunt current away from the light emitting diode 170, which then will not emit light. Additionally, when the signal Q is in a logic 1 condition, such signal will operate through resistor 205 to cause light emitting diode 171 to emit light.

In operation of the power supply 60, the potentiometer 182 (FIG. 5) can be adjusted to determine the frequency that signals are developed in the opto-isolators to drive the respective FETs 135, 136. Adjustment of the potentiometer 194 (FIG. 5) determines the proportion of time that FET 135 is on relative to the time that FET 136 is on and, therefore, the proportion that time current is supplied to respective power outputs 15, 16. Adjustment of the potentiometer 103 (FIG. 4) determines the magnitude of current actually delivered to the power output terminals 15, 16. The current sensor circuitry 64 and DC power supply 61 cooperate to maintain a substantially constant current level, as is set by the potentiometer 103, at the power output terminals during plating.

It will be appreciated from a review of the circuit portion 70 of FIG. 4 that the outputs to the opto-isolators are complementary. Therefore, when one light output is on, the other is off; and vice versa. An advantage to the complementary outputs is that the current density in the bath may be maintained substantially constant without regard to which anode is being energized at a particular time.

However, it will be appreciated that other means may be provided for developing the driving signals for the FETs 135, 136, either optical or otherwise. Moreover, the means for developing the driving signals for the FETs 135, 136 may either be coupled in the complementary manner illustrated or may be developed independently. An example of independent developing of such signals may be achieved by using separate monostable multivibrators independently controlled by the current control circuit 64 and/or by the circuit portion 70, as will be evident to those having ordinary skill in the art.

An advantage of the present invention is the ability to adjust the circuit 60 to compensate for a difference in the efficiency and electrochemical equivalent of the various electrodes. For example, relative to the cathode one anode may be relatively efficient, say 90 percent efficient, and a second anode may less (or more) efficient, say 80 percent efficient. Over time the ingredient added to the plating bath by the more efficient anode will increase in the bath relative to another ingredient supplied by the other less efficient anode. The invention permits a change in the times that each of the anodes is energized thereby to maintain uniform composition of the bath.

As was mentioned above with respect to the power supply 20 in FIGS. 1 and 2, the invention lends itself to both automated and manual control. Manual control, e.g., by setting the current density at potentiometer 103, and relative amounts of energization times for the respective cathodes or groups of cathods, e.g., by setting the potentiometer 194, has been described above for the power supply 60 of FIGS. 3 and 4. Automated control would include the use of a sampling tap 54, analyzer 56 and possibly additional interface and/or control circuitry of conventional design 58, that would provide an input to the power supply circuit 60. An exemplary connection would be one shown at 57' in FIG. 5 to bias the 555 timer 175 causing it to change the relative amounts of time that the respective electrodes or groups of electrodes are energized by power supply 60. Another automated control connection may be to the VCO 110, as is described further below.

Another advantage of the present invention is that although the invention is particularly suited for use in alloy plating using electrodes of different materials, it is usefull, too, for plating using electrodes of the same material and even in circumstances in which the plating material is furnished the electroplating bath as an additive to the bath, i.e., not being directly supplied by a respective anode. Using the time multiplexing features of the invention, especially also with the constant current feature, one anode or group of anodes may be energized for one period of time, and subsequently a different anode or group of anodes may be energized. During the time that an anode or group of anodes is deenergized such anode or group may depolarize. The amount of time that the anodes are deenergized can be determined in the power supply circuit 20 by the general control 35; and the amount of time that the anodes are deenergized can be determined in the power supply circuit 60 by alteration of the frequency of the VCO 110. Further, if the power supply circuits of the invention were altered for use to energize respectively and sequentially three or more anodes or groups of anodes, then the amount of time that a particular anode or group is deenergized can be further increased to facilitate and/or to enhance depolarization.

A problem experienced in prior art electroplating baths, especially alloy plating baths of the type in which two different types of electrodes are used, has been the formation of a plated layer on or plating of one anode relative to another. For example, if both nickel electrodes and zinc electrodes were used in the bath, and both were intended to contribute metal to the bath for alloy plating of a cathode, then it has been found that material of one anode sometimes would plate onto the other. Such plating of an anode would change the efficiency thereof and the general balance of the plating system. To accommodate such imbalance, it has been customary to require that anodes be placed in a plating bath and the bath operated for a prescribed period of time until a balanced condition would exist. A typical procedure to correct such imbalance would be to change the voltage applied to one anode relative to the other; but this further exacerbates the imbalance because due to a potential difference between such anodes additional plating or a change in plating of one relative to the other or onto the other will occur.

The present invention overcomes the foregoing problem by preferably permitting the deenergized anodes to float electrically when not energized. Therefore, there will not be a potential difference or at least will only be a minimal potential difference between energized and deenergized anodes and/or the impedance in an electrical circuit containing such electrodes will be so relatively high as to prevent or at least to minimize any current flow therebetween and, thus, plating of one relative to the other.

The invention is useful to facilitate depolarization of anodes. An anode may form an oxide coating on it. Such coating can reduce the solubility of the anode in the bath, thus reducing anode efficiency. Therefore, the voltage required to drive that anode to apply the desired amount of ingredient to the bath therefrom, in the past, has had to be increased. Such oxide coating is due to a concentration of oxygen at the anode during energization or operation thereof. Using the present invention, one anode or group of anodes may be energized for a particular duration while another anode or group of anodes is deenergized. During the period that it/they is/are deenergized, the oxygen concentration at such deenergized anode(s) will have time to dissipate in the bath. As a result, the amount of oxide coating that will accumulate on such anode(s) when subsequently energized will be less than has been experienced in the prior electroplating systems.

Moreover, since the invention can be use both for alloy plating and for single material plating, or for plating in which the relative amounts of time that each electrode or electrode group are energized is the same, a savings in equipment cost can be realized because only one power supply may be used to perform both types of plating functions.

Another advantage of the present invention is the ability to prevent so-called creep, growth or increase of a particular ingredient in an electroplating bath. This is a particular problem in alkaline zinc plating wherein the anode efficiency can be greater than the cathode efficiency. As is known, inert anodes (also known as non-dissolving electrodes) sometimes are placed in an electroplating bath alone or together with anodes that contribute material to the bath. When the concentration of an ingredient contributed by the latter anodes or by some other means exceeds a prescribed level or is at least at a desired level, the inert electrodes are energized and the others are deenergized. In this way electroplating can continue while using up the mentioned ingredient from the bath after which the ingredient contributing anodes will be energized instead of the inert electrodes. The present invention is suited for use in such an environment because the respective power supplies may be switched in time multiplexed fashion to energize the ingredient contributing anodes and the inert anodes for respective amounts of time such that the particular ingredient that tends to grow in the bath will remain substantially at a stable concentration in the bath, while plating still is carried out at constant current. Moreover, the relative amounts of time that such electrodes may be energized can be changed, as was described above, further to change the concentration of the mentioned ingredient in the bath.

The present invention provides versatility in controlling the nature of plating onto the cathode. For example, the present invention enables control of when and for how long a particular anode or group of anodes is energized. Considering a plating system in which only one anode (or group) is used, the duty cycle of applied power can be changed, i.e., to determine for how long in each of a prescribed period the anode is energized. Therefore, if such period were selected to be one second and a duty cycle of 0.8 second were selected, then in that period for 0.8 second the anode would be energized and for 0.2 second the anode would not be energized. During the time that the anode is energized, preferably current flow is provided to achieve constant current density and plating at the cathode even as the impedance of the bath, anode efficiency cathode efficiency/conductivity, etc. may change. During the time that the anode is deenergized, no plating occurs. Such control provides control to achieve a particular type of plating, polishing, or other processing, as may be desired.

Furthermore, the aforementioned control of duty cycle can be used to control average current. This is true regardless of whether one anode or several anodes are used in the plating system. The amount of plating or metal deposited is a function of coulombs. Therefore, if current is turned off for a duration in a particular period of operation of the plating system, average current and the amount of coulombs are reduced; and this is accomplished even though when the plating current is on it in fact is supplied at a prescribed constant level. This feature further helps to assure accurate control and constant characteristics of the plating.

Figure 6:
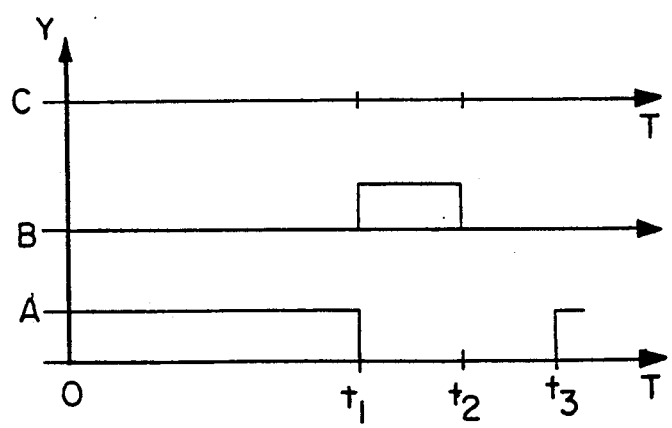
FIG. 6 is a waveform diagram showing three waveforms used in accordance with the invention to provide energization of respective anodes while providing control of average current.

Extending the features described just above to a multiple anode system and a power supply that uses one more output than the number of anodes employed, by varying the amount of time that each of the anodes is energized in a given operational period of the power supply and the amount of time that the power supply is not energizing an anode, the average current also can be controlled while plating by the other anodes is accomplished at constant current. Referring, for example, to FIG. 6, three wave forms A, B, and C are shown occurring in a time period T. From time 0 to t1 waveform A is on; and a first anode or group of anodes is energized by an output from power supply 60, for example; also, waveforms B and C are off and the second and third (the third not being shown in the power supply 60) outputs from the power supply and anodes are not energized. From time t1 to time t2 waveform B is on and the respective anode is energized, while the others are deenergized. Finally, from time t2 to time t3, which ends the period, none of the waveforms A, B or C is on; and, therefore, none of the anodes is energized. Accordingly, average current is reduced from a circumstance that each electrode is energized at some time during the period such that there would not be any time during which plating would not be occurring. The actual durations of the respective waveforms A, B and C can be changed according to the invention thereby to change average current while still assuring that during plating current density is constant.

The ability to control average current is particularly advantageous to maintain a uniform plating from part to part, especially as the size of the cathode (part) and/or the number of cathodes being plated at one time in a bath may change.

It is believed that an effective capacitance may occur at the interface between an anode and the electrolytic bath in which it is placed. The present invention provides for control of the frequency and pulse width of signals energizing respective anodes. Therefore, the effect of such capacitance can be controlled, used to advantage, and/or eliminated as a function of the selected energization characteristics of such anodes. For example, by increasing the frequency and decreasing the pulse width of the signals energizing an anode, the effect of such capacitance can be minimized or eliminated. Similiarly, by reducing the frequency and increasing the pulse width, the effect of such capacitance can be increased.

In the past computer systems have been used to monitor various parameters in an electroplating system. For example, such computers have monitored and provided output information concerning the characteristics of the chemicals in a plating bath, have monitored and/or controlled current in the bath and have generated reports concerning operation of the bath.

Figure 8:
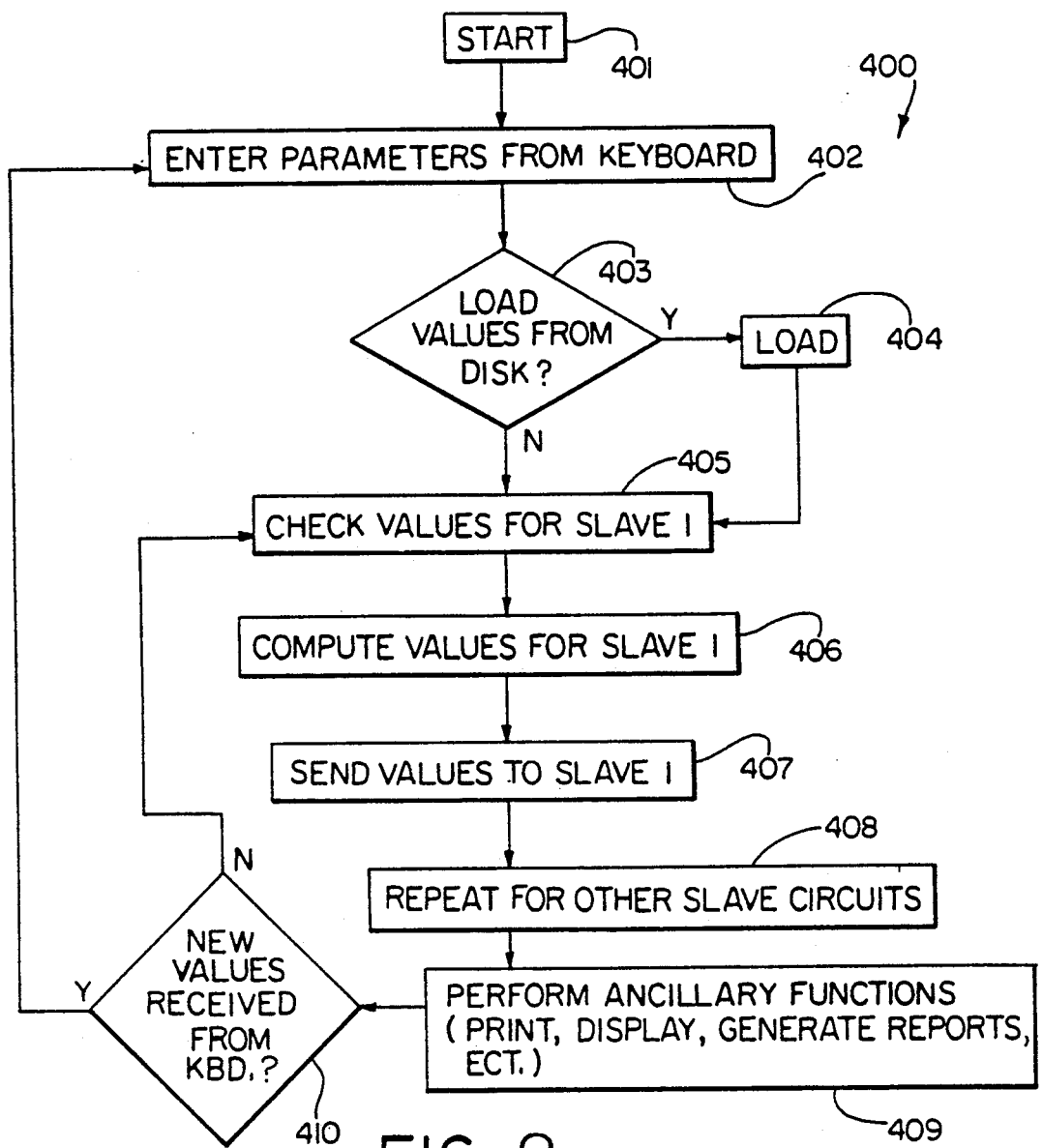
FIG. 8 is a computer program flow chart representative of the operation of the computer controlled electroplating system of FIG. 7.
Figure 7:
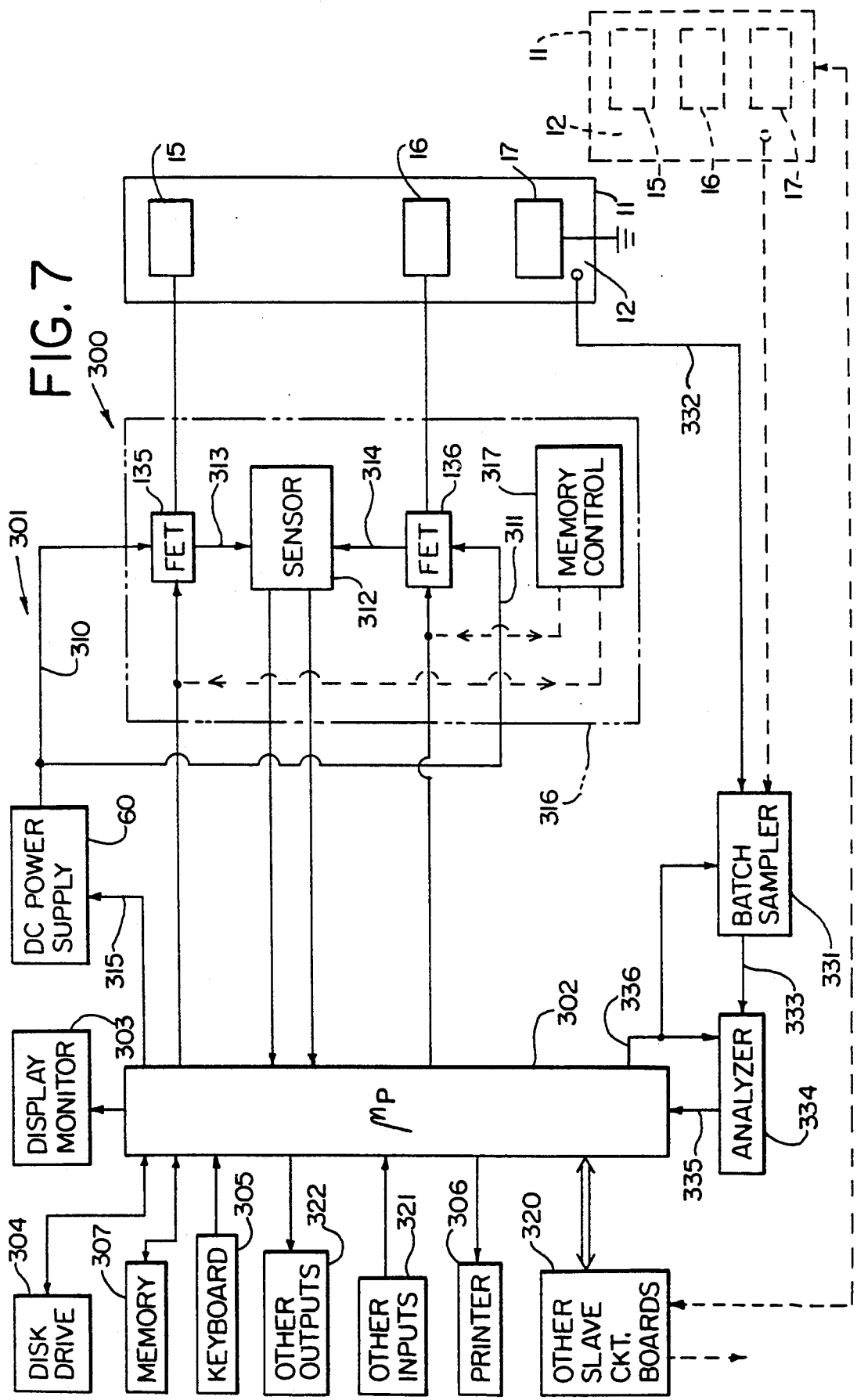
FIG. 7 is a schematic block circuit diagram of a computer controlled electroplating system in accordance with an embodiment of the invention.

Turning, now, to FIGS. 7 and 8, a computerized electroplating system 300 in accordance with the present invention is illustrated. The system 300 is operative not only to provide the monitoring, control and report functions of prior computer systems, but the system 300 also is operative for time multiplexing operation and constant current operation.

The system 300 includes an electroplating bath 11 containing an electrolyte 12 and one or more, in this case two groups of anodes 15, 16 and a cathode 17. The cathode 17 is shown coupled to a ground connection relative to the computerized power supply 301. The computerized power supply is operative to supply potential difference/voltage across the cathode and respective anodes to cause current flow at respective times, preferably in a time multiplexed fashion generally as was described above while providing current and voltage monitoring and control. In particular, preferably the computerized power supply 301 provides a constant current flow in the plating bath 12 during energization of the respective anodes 15, 16.

The computerized power supply 301 now is described with reference to the exemplary circuit illustrated in FIG. 7. It will be appreciated that other types of computerized or otherwise automated power supply circuits also may be used in accordance with the present invention to provide the desired operative functions described herein.

A microcomputer 302, which includes, for example, a microprocessor, associated memory 307, and other conventional circuitry, in the computerized power supply 301 has a plurality of conventional devices coupled thereto, including, for example, a monitor 303, disk drive 304, keyboard 305, and printer 306. The monitor 303 provides visual output for operation of the system 300 by a person. The disk drive 304 stores a computer program for loading into the system memory 307 for controlling operation of the microcomputer 302 and the system 300. The disk drive 304 also can store information concerning the operation of the plating bath 11, constituency of the bath, anode operation, etc. The keyboard 305 provides operative interface between a person operating the system 300 and the system itself. For example, the person can input information and/or commands into the system 300 via the keyboard to change the times that respective anodes are operated, duty cycles, frequencies, etc., e.g., as a function of the type of cathode being plated, of the age of the anodes, of temperatures, of changed plating characteristics desired, etc. The printer 306 may be used to provide a hard or printed copy of information concerning operation of the bath 11 and the system 300, as is conventional.

The microcomputer 302 is coupled via lines 310, 311 to provide control inputs to the power field effect transistors (FET's) 135, 136 to enable them selectively to energize respective anodes 15, 16. Conventional interface circuitry may be employed between the microcomputer 302 and the FET's 135, 136. The power to the FET's 135, 136 is supplied via a DC power supply, such as that illustrated at 60 in FIG. 4. The computer power supply circuitry 301 illustrated in FIG. 7, then, as will be appreciated, functions to develop the control signals developed in the circuit of FIG. 5 to drive the FET's 135, 136. Therefore, the computer power supply 301 is operative to determine when, for how long, for how long relative to each other, current levels, etc., at which the FET's 135, 136 are energized and, thus the respective anodes 15, 16 are energized.

Current and voltage sensor 312 is coupled to the respective power FET's 135, 136 via lines 313, 314 and provides inputs to the microcomputer 302 to indicate the actual current and voltage at the respective anodes. Such information may be processed in the microcomputer in conventional fashion, compared to a value set at the keyboard 305, for example, and/or by the program received from the disk drive 304, and may be used to alter an operative output parameter of the microcomputer. As an example, if the current is too low, the microcomputer may send a signal on line 315 to the DC power supply 60 to change an operation thereof to alter current, voltage, etc., that is ultimately supplied to the respective anode(s), e.g., as was described above with respect to FIGS. 4 and 5.

A circuit board 316 may be provided on which the power FET's 135, 136, current and voltage sensor 312 and other conventional interface circuitry may mounted. Such circuit board 316 also may be include a memory 317 with operation controlling capability for operating the power FET's 135, 136 and/or for storing information as to current and voltage sensed and as to operating characteristics of the power FET's 135, 136 as received from the microcomputer 302. Therefore, the memory may be coupled to the lines 310, 311 to receive signals from the microcomputer 302. Such signals represent the desired frequency and periods and time multiplexing operation of the power FET's 135, 136. The memory then provides signals to the power FET's to drive them in the fashion prescribed by the microcomputer. In this way, the microcomputer can download to the memory 317 the operational characteristics for the FET's 135, 136 and thereafter the memory controls such operation of the FET's until next updated by the microcomputer 302. Similarly, information concerning current and voltage at the respective anodes and/or FET's 135, 136 as sensed by the current and voltage sensor 312, can be stored in the memory 317 and subsequently transmitted to the microcomputer 302 when the latter reads such memory.

Using several such circuit board interfaces 316 (also referred to as slave power output circuits), then, it will be appreciated that the microcomputer 302 may be used to control several of such interface circuit boards and, thus, several different electroplating baths 11. Examples of such multiple bath control is depicted by box 320, which represents connections to one or more additional circuit boards 316 (not shown), which are in turn coupled to energize respective plating baths 11', and so on. It will be appreciated that the several plating baths may be operated according to the same or different parameters, such as plating current, voltage, average current, etc., depending on the characteristics of the plating material, plating itself, cathode(s), anode(s) and so on. Based on values stored on the disk drive 304, in the memory 307 and/or input from the keyboard 305 or based on some other input to the microcomputer 302, the latter will be operative in conventional manner to achieve the desired operative control of such circuit boards 316 (320) and associated plating baths. Examples of such other inputs to the microcomputer 302 are represented at 321. Such inputs may be derived from other electrical or electro-mechanical equipment, such as a switch, another computer, etc. Further, other outputs 322 may be provided from the microcomputer 302 to deliver information therefrom to other means, such as other monitors, telephone lines, printers, mass storage media, etc.

Sensing of the nature of the bath 11 may be performed automatically using a detector 330. The detector 330 includes a batch sampler 331 which is coupled by a fluid connection 332 to derive a sample of the electrolyte 12 from bath 11. Preferably the batch sampler 331 also is connectible to other electroplating baths which are monitored and controlled by the computer power supply 301. When a particular bath 12 is sampled, the batch sampler 331 transmits the sample via flow line 333 to an analyzer 334. An exemplary analyzer is an X-ray fluorescence analyzer, as was mentioned above. Alternatively, another type of analyzer also may be used. The analyzer 334 sends to the microcomputer 302 information on line 335 indicating the characteristic(s) detected by the analyzer, such as the nature, concentrations, etc. of the electrolyte 12 in the bath 11. This information can be used by the microcomputer in conventional manner, e.g., as was described above, to alter the nature of the energization of the respective anodes in the bath. For example, the ratio of the duty cycles of the respective anodes can be changed to maintain the desired ratio of ingredients in the bath. Control connections from the microcomputer 302 are indicated at 336. Such control connections may be used to determine which of the respective baths and when the detector 300 is to analyze the constituency, etc., thereof.

Referring briefly to FIG. 8, a computer program flow chart 400 is illustrated. The flow chart 400 is a shorthand representation of a computer program that may be used to operate the computerized electroplating system 300 of FIG. 7, for example. It will be appreciated that a person having ordinary skill in the art would be able to write the appropriate detailed source code to achieve desired operation according to the flow chart 400. The flow chart 400 is exemplary, and others as well as modified versions thereof may be employed depending on the actual desired operation of the system 300, plating characteristics desired, components used, and so on.

At block 401 the program starts. As is conventional various values may be initialized; the program and/or other information stored on the disk drive 304 may be loaded into memory 307, etc. At block 402 parameters may be entered from the keyboard 305. Such parameters may be representative of the nature of the electroplating that is to be carried out in a particular bath and, thus, the relative amounts of time that respective anodes therein are to be energized, the desired tolerances within which the bath is to be maintained (e.g., concentration of ingredients), etc.

An inquiry is made at block 403 to determine whether values are to be loaded from disk drive 304. For example, if all values are to be loaded from the keyboard, then they may not be needed from the disk drive; and vice versa. If affirmative, then at block 404 values are loaded into memory 307 after which the program continues at block 405 to check the values, such as current, voltage, bath constituency, etc., from the first plating bath 11; if negative, then from block 403 the program flows directly to block 405.

At block 406 values for current, voltage, times, etc., for operation of the first electroplating bath 11 are computed and are sent at block 407 to the first slave circuit board 316 for storage in the memory 317 thereof. Such slave circuit board then operates the respective plating bath until next called on by the microcomputer 302. At block 408 the next slave circuit board 316 (not shown) is read and updated with values to operate the associated plating bath, and so on until all (or the sole one) of the slave circuit boards and associated plating baths have been read and updated by the microcomputer.

Next, at block 409 ancillary functions are performed by the computerized power supply 301. These may include printing of information, storing of information, generating reports, displaying data, and so on. At block 410 an inquiry is made to determine whether a key at the keyboard 305 has been pressed, e.g., interrupt detection. If affirmative, then the program flows back to block 402 to read the keyboard. If negative, then the program flows to block 405 to continue in cyclical operation as described above.

Using the invention for strip plating, current density can be controlled accurately during start up of the strip. The strip ordinarily would start relatively slowly and then would speed up. In order to obtain the same amount of plating during the start up and during steady state operation, the invention enables a lower current density to be provided during start up and a higher current density during steady state drawing of the strip through the plating bath. Accordingly, the number of coulombs applied to the strip during the start up time and applied to a different part of the strip when the strip is moving at steady state can be controlled to be approximately the same. As a result, substantially uniform plating at both the ends and mid-portions of the strip can be achieved.

Various features of the invention shown and/or described with respect to a particular drawing figure or embodiment hereof may be used with the other drawing figures or embodiments hereof, as will be evident to those having ordinary skill in the art upon reading the instant disclosure.

STATEMENT OF INDUSTRIAL APPLICATION

From the foregoing it will be appreciated that the present invention may be used to plate objects in electroplating processes.

What is claimed is:

1. Apparatus for electrolytic processing of materials, comprising an electrolytic processing bath, plural first electrodes, at least one second electrode, and computerized power supply means for supplying time multiplexed power to said electrodes so as to selectively supply power at different times to said plural electrodes and said at least one second electrode.

2. The apparatus of claim 1, said electrolytic processing bath comprising an electroplating bath and such electrolytic processing comprises electroplating.

3. The apparatus of claim 1, further comprising means for maintaining substantially constant the current flow during such processing.

4. The apparatus of claim 1, said first electrodes comprising anodes, and said second electrode comprising a cathode, wherein said electrolytic processing bath comprises an electroplating bath and such electrolytic processing comprises electroplating, and wherein at least one of said anodes contributes material to said bath for electroplating.

5. The apparatus of claim 4, wherein said power supply controls the times that each of said anodes is energized to tend to maintain the composition of said bath substantially within prescribed limits.

6. The apparatus of claim 1, wherein said time multiplexed power is operative to control an effective capacitance occurring at the interface between at least one of said electrodes and said electrolytic bath in which said electrode is placed.

7. The apparatus of claim 6, wherein said time multiplexed power is frequency modulated.

8. The apparatus of claim 6, wherein said time multiplexed power is pulse width modulated.

9. Apparatus for electrolytic processing of materials, comprising an electrolytic processing bath, plural first electrodes, at least one second electrode, and computerized power supply means for supplying time multiplexed power to said electrodes, said first electrodes comprising anodes, and said at least one second electrode comprising a cathode, wherein said electrolytic processing bath comprises an electroplating bath and such electrolytic processing comprises electroplating, and wherein at least one of said anodes contributes material to said bath for electroplating, and wherein a plurality of said anodes are of different respective materials and contribute material to said bath for alloy electroplating.

10. Apparatus for electrolytic processing of materials, comprising an electrolytic processing bath, plural first electrodes, at least one second electrode, and computerized power supply means for supplying time multiplexed power to said electrodes.

said first electrodes comprising anodes, and said second electrode comprising a cathode, wherein said electrolytic processing bath comprises an electroplating bath and such electrolytic processing comprises electroplating, and wherein at least one of said anodes contributes material to said bath for electroplating, and wherein one of said anodes is inert and does not contribute material to said bath for electroplating, and wherein said power supply controls the times that each of said anodes is energized to tend to maintain the composition of said bath substantially within prescribed limits.

11. Apparatus for electrolytic processing of materials, comprising an electrolytic processing bath, plural first electrodes, at least one second electrode, and computerized power supply means for supplying time multiplexed power to said electrodes, and said first electrodes comprising anodes, and said second electrode comprising a cathode, and said power supply means being operative selectively to supply power to a first anode and said cathode and at a different time to supply power to a second anode and said cathode.

12. The apparatus of claim 8, further comprising means for tending to maintain the current substantially constant level including means for maintaining such level substantially without regard to the electrodes to which power is being supplied.

13. Apparatus for electrolytic processing of materials, comprising an electrolytic processing bath, plural first electrodes, at least one second electrode, and computerized power supply means for supplying time multiplexed power to said electrodes, and said power supply means comprising plural output channels for selectively supplying power to respective electrodes, each output channel including a pulse width modulator, and further comprising a general control means for selectively enabling respective output channels.

14. Apparatus for electrolytic processing of materials, comprising an electrolytic processing bath, plural first electrodes, at least one second electrode, and computerized power supply means for supplying time multiplexed power to said electrodes, and said power supply means comprising pulse position modulating means for modulating the frequency at which power is supplied to said electrodes.

15. The apparatus of claim 14, said power supply means further comprising duty cycle determining means for determining the relative amounts of time that respective electrodes are energized by said power supply means relative to the amount of time that other electrodes are energized.

16. Apparatus for electrolytic processing of materials, comprising an electrolytic processing bath, plural first electrodes, at least one second electrode, and computerized power supply means for supplying time multiplexed power to said electrodes, and said power supply means further comprising duty cycle determining means for determining the relative amounts of time that respective electrodes are energized by said power supply means relative to the amount of time that other electrodes are energized.

17. The apparatus of claim 16, comprising control means for determining a characteristic of said electrolytic processing bath, and feedback means responsive to said control means for providing an input to said power supply means to control the operation to control such duty cycle and the composition of said bath.

18. The apparatus of claim 14, said control means comprising an X-ray fluorescence analyzer.

19. Apparatus for electrolytic processing of materials, comprising an electrolytic processing bath, plural first electrodes, at least one second electrode, and computerized power supply means for supplying constant current to electrodes, wherein said means for supplying constant current include means for selectively supplying power at different times to said plural first electrodes and said at least one second electrode.

20. Apparatus for electrolytic processing of materials, comprising an electrolytic processing bath, plural first electrodes, at least one second electrode, and computerized power supply means for supplying constant current power to said electrodes, and further comprising means for selectively supplying power at different times to plural electrodes while maintaining substantially constant current flow at respective electrodes when power is supplied thereto.

21. A method for electrolytic processing of materials, comprising placing plural first electrodes in an electrolytic processing bath, placing at least one second electrode in such bath, and at different times supplying power between at least one of such first electrodes and such at least one second electrode and supplying power between at least another of such first electrodes and such at least one second electrode, and wherein said supplying power provides depolarization time for respective electrodes when deenergized.

22. A method for electrolytic processing of materials, comprising placing plural first electrodes in an electrolytic processing bath, placing at least one second electrode in such bath, and at different times supplying power between at least one of such first electrodes and such at least one second electrode and supplying power between at least another of such first electrodes and such at least one second electrode, and further comprising controlling average current to such processing bath by controlling periodic interrupting of current thereto.

23. The method of claim 22, further comprising maintaining substantially constant the current in such processing bath when current is supplied thereto.

24. A computerized power supply for an electrolytic processing apparatus, comprising plural output connection means for electrically coupling power to plural electrodes of such electrolytic processing apparatus, and computerized time multiplexing means for supplying power to said output connection means selectively to supply power across one pair of such plural electrodes and at a different time to supply power to a different pair of such plural electrodes.

25. The supply of claim 23, said time multiplexing means comprising a pulse width modulator.

26. The supply of claim 23, said time multiplexing means comprising a pulse position control.

27. The supply of claim 23, said time multiplexing means comprising a frequency control.

28. A method of supplying power to an electrolytic processing apparatus that includes plural electrodes, comprising providing a source of power, and supplying such power in time multiplexed manner selectively to one pair of plural electrodes of such electrolytic processing apparatus and at a different time to to a different pair of such plural electrodes and using a computer to maintain a substantially constant current density during such electrolytic processing.

29. Apparatus for electrolytic processing of materials, comprising plural electrolytic processing baths, in each bath plural first electrodes, at least one second electrode, power supply means for supplying power to said baths, and computerized power supply control means for controlling the supplying of power to said electrodes in said respective baths, and wherein said supplying of power in each of said respective baths includes selectively supplying power at different times to said plural first electrodes and said at least one second electrode.

30. Apparatus for electrolytic processing of materials, comprising plural electrolytic processing baths, in each bath plural first electrodes, at least one second electrode, power supply means for supplying power to said baths, and computerized power supply control means for controlling the supplying of power to said electrodes in said respective baths, and further comprising a slave circuit means associated with each bath for interfacing with said computerized power supply control means, said slave circuit means being operative to store information received from said computerized power supply control means to energize the respective electrodes of the associated bath.

31. The apparatus of claim 30 said slave circuit means further comprising means for storing values representing parameters occurring in the associated bath for subsequent reading by said computerized power supply control means.

32. Apparatus for electrolytic processing of materials, comprising an electrolytic processing bath, plural first electrodes, at least one second electrode, and computerized power supply means for supplying time multiplexed power to said electrodes, and wherein at least one of said plural first electrodes electrically floats relative to at least one other first electrode when the former is not receiving power thereby to minimize the possibility of plating between such first electrodes.

* * * * *